(12) United States Patent
Sivalingam et al.

(10) Patent No.: US 9,039,368 B2
(45) Date of Patent: May 26, 2015

(54) WIND TURBINE NACELLE WITH COOLER TOP

(75) Inventors: Krishnamoorthi Sivalingam, Singapore (SG); Anand Bahuguni, Singapore (SG); Ravi Kandasamy, Singapore (SG); Srikanth Narasimalu, Singapore (SG); John K. Grevsen, Viby J (DK); Jesper Nyvad, Egå (DK); Paul T. Tietze, Brabrand (DK)

(73) Assignee: Vestas Wind Systems A/S, Aarhus N. (DK)

( * ) Notice: Subject to any disclaimer, the term of this patent is extended or adjusted under 35 U.S.C. 154(b) by 968 days.

(21) Appl. No.: 13/146,364

(22) PCT Filed: Jan. 29, 2010

(86) PCT No.: PCT/DK2010/050022
§ 371 (c)(1),
(2), (4) Date: Nov. 18, 2011

(87) PCT Pub. No.: WO2010/085960
PCT Pub. Date: Aug. 5, 2010

(65) Prior Publication Data
US 2012/0063890 A1   Mar. 15, 2012

Related U.S. Application Data

(60) Provisional application No. 61/148,508, filed on Jan. 30, 2009.

(30) Foreign Application Priority Data

Jan. 30, 2009 (DK) .................................. 2009 00149

(51) Int. Cl.
*F03D 11/00* (2006.01)

(52) U.S. Cl.
CPC ............. *F03D 11/00* (2013.01); *F05B 2260/20* (2013.01); *F05B 2260/64* (2013.01); *Y02E 10/722* (2013.01); *Y02E 10/726* (2013.01)

(58) Field of Classification Search
USPC ........................................................ 415/177
See application file for complete search history.

(56) References Cited

U.S. PATENT DOCUMENTS

| 6,903,466 B1 | 6/2005 | Mercier et al. |
| 2001/0035651 A1 | 11/2001 | Umemoto et al. |

(Continued)

FOREIGN PATENT DOCUMENTS

| DE | 30 10 485 | 9/1981 |
| DE | 102 33 947 | 2/2004 |

(Continued)

OTHER PUBLICATIONS

International Preliminary Report on Patentability (Chapter I of the Patent Cooperation Treaty); The International Bureau of WIPO, PCT/DK2010/050023, Aug. 2, 2011, 6 pgs.

(Continued)

*Primary Examiner* — Richard Edgar
(74) *Attorney, Agent, or Firm* — Wood, Herron & Evans, LLP (57) ABSTRACT

The present invention relates to a wind turbine nacelle having a first face with a longitudinal extension in a wind direction, comprising a cooling device having a cooling area and extending from the first face of the nacelle, and a cover having at least one inner face, the cooling device being enclosed by the first face of the nacelle and the inner face of the cover. A first distance between at least one of the faces and the cooling area is at least 30 mm.

32 Claims, 10 Drawing Sheets

(56) References Cited

U.S. PATENT DOCUMENTS

| | | | |
|---|---|---|---|
| 2006/0113804 A1 | 6/2006 | Costin | |
| 2008/0247875 A1 | 10/2008 | Yoshida | |
| 2010/0061853 A1* | 3/2010 | Bagepalli | 416/95 |

FOREIGN PATENT DOCUMENTS

| | | |
|---|---|---|
| DE | 103 51 844 | 6/2005 |
| EP | 1 081 376 | 3/2001 |
| EP | 1 586 769 | 10/2005 |
| EP | 1 612 415 | 1/2006 |
| GB | 203 307 | 9/1924 |
| JP | 2005-83659 | 3/2005 |
| JP | 2008-247325 | 10/2008 |
| WO | 2008/131766 | 11/2008 |
| WO | 2009/033925 | 3/2009 |
| WO | 2009/115100 | 9/2009 |

OTHER PUBLICATIONS

International Preliminary Report on Patentability (Chapter I of the Patent Cooperation Treaty); The International Bureau of WIPO, PCT/DK2010/050022, Aug. 2, 2011, 6 pgs.

International Preliminary Report on Patentability (Chapter I of the Patent Cooperation Treaty); The International Bureau of WIPO, PCT/DK2010/050024, Aug. 2, 2011, 7 pgs.

International Preliminary Report on Patentability (Chapter I of the Patent Cooperation Treaty); The International Bureau of WIPO, PCT/DK2010/050025, Aug. 2, 2011, 6 pgs.

Sven Nytoft Rasmussen, Ph.D.; 1st Technical Examination and Search Report issued in priority Denmark Application No. PA 2009 00149; Sep. 15, 2009; 4 pages; Denmark Patent and Trademark Office.

Ulrich Gebker; International Search Report and Written Opinion issued in priority International Application No. PCT/DK2010/05022; Feb. 3, 2011; 10 pages; European Patent Office.

Carsten Nielsen; 1st Technical Examination and Search Report issued in related Denmark Application No. PA 2009 00151; Sep. 14, 2009; 5 page; Denmark Patent and Trademark Office.

Ulrich Gebker; International Search Report and Written Opinion issued in related International Application No. PCT/DK2010/05023; Feb. 3, 2011; 10 pages; European Patent Office.

Sven Nytoft Rasmussen, Ph.D.; 1st Technical Examination and Search Report issued in related Denmark Application No. PA 2009 00148; Sep. 15, 2009; 4 pages; Denmark Patent and Trademark Office.

Ulrich Gebker; International Search Report and Written Opinion issued in related International Application No. PCT/DK2010/050024; Feb. 11, 2011; 11 pages; European Patent Office.

Carsten Nielsen; 1st Technical Examination and Search Report issued in related Denmark Application No. PA 2009 00150; Sep. 3, 2009; 4 pages; Denmark Patent and Trademark Office.

Ulrich Gebker; International Search Report and Written Opinion issued in related International Application No. PCT/DK2010/050025; Feb. 3, 2011; 10 pages; European Patent Office.

* cited by examiner

WIND TURBINE NACELLE WITH COOLER TOP

FIELD OF THE INVENTION

The present invention relates to a wind turbine nacelle having a first face with a longitudinal extension in a wind direction, comprising a cooling device having a cooling area and extending from the first face of the nacelle, and a cover having at least one inner face, the cooling device being enclosed by the first face of the nacelle and the inner face of the cover.

BACKGROUND ART

A wind turbine converts wind power into electrical energy by using a generator placed among other equipment in the nacelle of the wind turbine. When the generator converts energy, the walls and the air surrounding the equipment are heated and the equipment itself is thus heated, too.

When the equipment is heated, the efficiency with which the conversion occurs is substantially decreased. In order to cool the equipment, the walls and the air surrounding the equipment are cooled down by means of a heat sink positioned on top of the nacelle as shown in WO 2008/131766 A2. Thus, the cool outside air passes through the heat sink and cools a fluid within the heat sink which is subsequently used to cool the walls or the air surrounding the equipment.

However, such cooling constructions have shown not to be efficient enough to provide an optimal cooling of the walls and the air surrounding the equipment of the wind turbine nacelle.

SUMMARY OF THE INVENTION

It is an object of the present invention to wholly or partly overcome the above disadvantages and drawbacks of the prior art. More specifically, it is an object to provide an improved wind turbine nacelle which is able to cool the generator and other equipment inside the nacelle more efficiently than the solutions of prior art.

The above objects, together with numerous other objects, advantages, and features, which will become evident from the below description, are accomplished by a solution in accordance with the present invention by a wind turbine nacelle having a first face with a longitudinal extension in a wind direction, comprising:
  a cooling device having a cooling area and extending from the first face of the nacelle, and
  a cover having at least one inner face, the cooling device being enclosed by the first face of the nacelle and the inner face of the cover,
wherein a first distance between at least one of the faces and the cooling area is at least 20 mm.

When wind flows along a surface, the friction on the surface will slow the wind down. Having a distance between the inner face and the cooling area makes the wind flow more even past the whole cooling area, including the edges of the cooling area. This design results in a more controllable cooling of the nacelle and the equipment comprised therein. A further advantage of enclosing the cooling device within the cover is thus that the cover guides the wind through the cooling area, and it may also provide the wind turbine nacelle with a recognisable design, which may be used to identify the manufacturer of the wind turbine.

In one embodiment, the first face is the top face of the wind turbine nacelle.

In another embodiment, the cooling device may comprise a fluid which is cooled by means of the wind flowing through the cooling area of the cooling device. The cooled fluid exchanges heat with the parts of the nacelle or equipment to be cooled.

In another embodiment, the distance may be at least 50 mm, preferably at least 80 mm, more preferably at least 100 mm.

Tests have shown that the cooling is more even when the distance is at least 50 mm, and still more even when the distance is at least 80 mm, and still more even when the distance is at least 100 mm.

In addition, the cover may have two side inner faces and an upper inner face, and the cooling device may be enclosed by the first face of the nacelle and the two side inner faces and the upper inner face of the cover.

When the cover has a substantially square-shaped cross-section, a standard cooling device may be used while still maintaining the distance between the cover and the cooling area.

Moreover, the cooling device may extend substantially perpendicular to the first face of the nacelle.

When the cooling device extends substantially perpendicular to the first face of the nacelle, the wind flows towards the cooling device at an angle of approximately 90° to the longitudinal extension of the cooling area, which results in an optimal cooling.

In addition, the inner face of the cover may extend in the longitudinal extension of the nacelle and substantially perpendicular to the cooling device.

The cover is thus able to guide the wind in a steady flow without changing the wind profile unnecessarily.

In one embodiment, more than one face may have a distance to the cooling area.

The distance between the upper inner face and the cooling area may be different from the distance between the side inner face and the cooling area.

Moreover, the distance between at least one of the faces and the cooling area may constitute a gap.

In another embodiment, the cooling device may have a blocked area which is unable to constitute a part of the cooling area.

The distance between at least one of the faces and the cooling area may constitute the blocked area.

Moreover, the gap, the cooling area, and the blocked area may all be adjustable. Furthermore, a plurality of cooling devices may be arranged either side by side or displaced in the longitudinal extension of the nacelle. Preferably, the cooling devices are arranged with a distance between them so that a gap is created through which gap the wind flow may also be led. When the wind flow is led through the gaps, a more efficient cooling is obtained.

In addition, the cover may have a front edge and the cooling device may be placed at a front distance from the front edge.

In one embodiment, the front distance may be at least 600 mm.

Moreover, the cover may, at least on its inside, have a front part tapering from the front edge towards the cooling device so as to guide air in through the cooling area.

Furthermore, the cooling device may be a free flow cooling device. In this context, the term "free flow cooling device" is to be understood as a device where no power-driven equipment, such as a fan or the like, is used for leading the wind flow to the cooling device. Using a free flow cooling device makes the cooling system of the nacelle more reliable. Also, since the use of fans or the like is avoided, a lower energy consumption is obtained. Since less equipment is arranged on the nacelle, the load on the nacelle has been minimised, and by not using fans or the like a reduction in noise has been observed.

In addition, the cooling device may be adapted to cool one or more wind turbine components, such as a generator, a transformer, a gear box, a frequency converter, etc.

In one embodiment, the cooling device may comprise a cooling medium adapted to exchange heat with the wind.

The blocked area may constitute at least 20% of an overall area of the cooling device, and it may be constituted by a plate, sheet, fabric, or awning.

Moreover, the blocked area may be blocked from circulating cooling fluid by means of valves.

In another embodiment, the blocked area may be constituted by two plates or sheets which are slidable in relation to one another in order to adjust the gap. The adjustment may be performed automatically in view of changes in wind speed and/or turbulence. The adjustment may for instance be performed by actuators or the like.

In addition, a part of the first face of the nacelle upwind from the cooling device may be substantially without projections.

In another embodiment, the inner faces of the cover may be substantially without projections.

The cooling device may be rotatable around a vertical and/or horizontal axis of the nacelle.

In addition, the blocked area may be constituted by a door.

In one embodiment, the cooling device may be arranged at a rear distance from a rear end of the wind turbine nacelle, and the rear distance may be at least 15% of a total length of the wind turbine nacelle.

Furthermore, the cover may be fastened to the nacelle so that the cover extends perpendicular to the longitudinal extension of the nacelle and partly along the nacelle creating a space between the nacelle and the cover.

According to the invention, the space may at least partly be filled with sound insulation material.

In addition, at least one part of the cover may be movable in relation to another part of the cover, the cooling device, or the first face of the nacelle.

Also, the movable part of the cover may be a hatch in the top of the cover.

According to the invention, the movable part of the cover may be the whole cover which is pivotably connected to the nacelle, or a hatch in the top of the cover.

In addition, the cover may have a flange projecting in an angle from the inner face, decreasing an opening defined by the first face and the inner face.

Also, the nacelle may further comprise a plurality of cooling devices arranged with a mutual distance.

Furthermore, the distance between two cooling devices may be between 20 and 200 mm, preferably between 50 and 150 mm, and even more preferably between 80 and 120 mm.

In one embodiment, one cooling device may be connected to one cooling circuit, and another cooling device may be connected to another cooling circuit.

In addition, the cooling circuits may be arranged so that they cool different components in the nacelle, for instance components in the drivetrain, such as the gearbox.

In another embodiment, one cooling device may be slidable in relation to another cooling device.

Furthermore, a hinge connection may be arranged between at least two cooling devices. The hinge connection may be arranged at a top and at a bottom of the cooling devices.

Also, the hinge connection may comprise at least two corrugated metal pipes, the corrugated metal pipes being connected to and extending between the cooling devices, and the corrugated metal pipes preferably being made of stainless steel. In this way, a reliable and steady hinge connection is obtained which may both compensate for dynamic loads and enable one cooling device to be opened if passage through the cooling device is desirable.

In another embodiment, the cooling device may be connected to the cover and the first face of the nacelle via at least two connection points, the first connection point being a rigid connection and the second connection point being a flexible connection. In this way, it is obtained that the cooling device may expand or contract due to temperature differences without damaging itself or the cover or nacelle.

Also, the at least two connection points may be made of conductive material. In this way, the cooling device may via its connection points be used as grounding for lightning, etc.

Furthermore, the nacelle may comprise a plate which is hingedly connected to the inner face of the cover or to a telescopic ladder.

Finally, the invention also relates to a wind turbine comprising a wind turbine nacelle as describe above.

BRIEF DESCRIPTION OF THE DRAWINGS

The invention and its many advantages will be described in more detail below with reference to the accompanying schematic drawings, which for the purpose of illustration show some non-limiting embodiments and in which.

All the figures are highly schematic and not necessarily to scale, and they show only those parts which are necessary in order to elucidate the invention, other parts being omitted or merely suggested.

DETAILED DESCRIPTION OF THE INVENTION

A wind turbine nacelle 1 is situated on a tower and has a front facing a hub in which a plurality of rotor blades 8, normally three blades, is fastened. The wind turbine nacelle 1 houses a generator and other equipment used for driving the conversion process of wind energy to electricity—also called the drive train. When producing electricity, the drive train produces a lot of heat, resulting in a less effective conversion process.

In order to cool the equipment and other parts of the nacelle, a cooling device 3 is arranged outside the nacelle 1. Wind flowing along a longitudinal extension of the nacelle flows in through at least one cooling area 4 of the cooling device 3 and cools a fluid within the cooling device. The cooled fluid exchanges heat with the parts of the nacelle 1 or equipment to be cooled.

The present invention will mainly be described in connection with an upwind wind turbine, i.e. a wind turbine where the nacelle is placed downwind from the wind turbine blades. However, the invention may as well advantageously be implemented in a downwind wind turbine, i.e. a wind turbine where the nacelle is placed upwind from the wind turbine blades.

Figure 1:
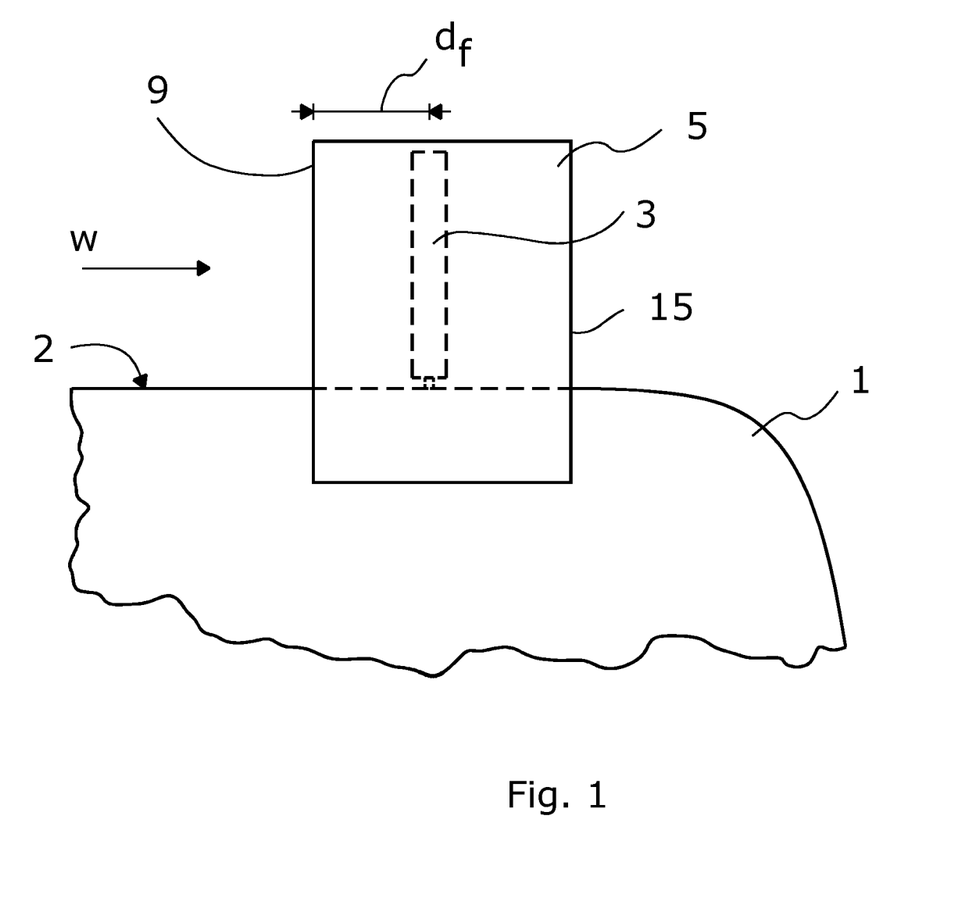
FIG. 1 shows part of a wind turbine nacelle according to the present invention.

FIG. 1 shows a partial view of the wind turbine nacelle 1 having a first face on which a cooling device 3 is arranged. The first face of the wind turbine nacelle is also the top face. The cooling device 3 is surrounded by a cover 5 extending from a top part of the nacelle 1. As can be seen, the cooling device 3 projects substantially perpendicular from the first face 2 of the nacelle 1 which face is also the top face of the nacelle. However, in another embodiment, the cooling device 3 may extend from the first face 2 of the nacelle in an angle different from 90° in order to provide a more optimal cooling. The arrow w indicates a wind direction. Also, the first face of the wind turbine nacelle may be a side face or a bottom face.

The cooling device is surrounded by the cover and the top face of the nacelle. However, the cover is open in front of the cooling device in relation to the wind direction. In this way, the wind flowing freely along the top face of the nacelle can also flow freely under the cover. Furthermore, the cover is open at the back of the cooling device so that the wind can flow through the cooling device and out through the back opening of the cover. Thus, there is no cover in front of or behind the cooling device hindering free flow of the wind. The cover only covers the cooling device at its top and sides.

As can be seen in FIG. 1, the cover 5 has a front edge 9, and the front edge is not perpendicular to the first face 2, but somewhat angled in relation to that. Both the front edge 9 and a back edge 15 are angled in this way. The cover 5 extends from the side of the nacelle 1 upwards and crosses over the first face 2 of the nacelle and is fastened in a similar way on the other side of the nacelle 1. Thus, the cover 5 has a roof part extending substantially parallel to the longitudinal extension of the first face 2 of the nacelle 1.

The cover 5 and thus the inner face 6 of the cover extend in the longitudinal extension of the nacelle 1 and substantially perpendicular to the cooling device 3. However, the cover wall may taper so as to guide the wind into the cooling device 3, or taper from the back edge 15 towards the front edge 9 of the cover.

In another embodiment, the front 9 and/or back edge 15 may be perpendicular to the longitudinal extension of the nacelle 1 or angled even more than shown in FIG. 1. Furthermore, the roof part of the cover 5 might be angled so that it tapers from the back edge 15 of the cover towards the front edge 9 of the cover.

In addition, the front edge 9 or leading edge of the cover may have a flange projecting from the inner face in an angle, preferably substantially perpendicular to the inner face of the cover, in order to strengthen the cover. The front edge of the cover may be bent so as to form the flange, or the flange may be attached to the cover. In this way, the opening defined by the cover and the top or first face of the nacelle is decreased by the flange. In the back of the cover in relation to the wind direction, the cover has a back edge or trailing edge. The back edge may in the same way be provided with a flange having an angle in relation to the inner face. The flange may also extend from the inner face between the front edge and the back edge, also defining a reinforcement of the cover.

In FIG. 1, the cooling device 3 and the cover 5 are arranged at a back distance from the end of the nacelle 1, e.g. a back distance of at least 30% of an overall length of the nacelle measured without the hub. In another embodiment, the cooling device 3 and the cover 5 are arranged just above the end part of the nacelle 1 so that the back edge 15 of the cover extends beyond the outermost part of the end of the nacelle.

The cooling device 3 is arranged at a front distance $d_f$ from the front edge 9 of the cover. This front distance $d_f$ may vary depending on the conditions under which the wind turbine is to operate and the placement of the cooling device 3 and the cover 5 in relation to the end part of the wind turbine nacelle 1. Even though the distance $d_f$ in FIG. 1 is shown from the front edge 9 of the cover to the middle of the cooling device, the distance may also be the distance $d_f$ from the front edge 9 of the cover to the front edge of the cooling device.

Figure 2:
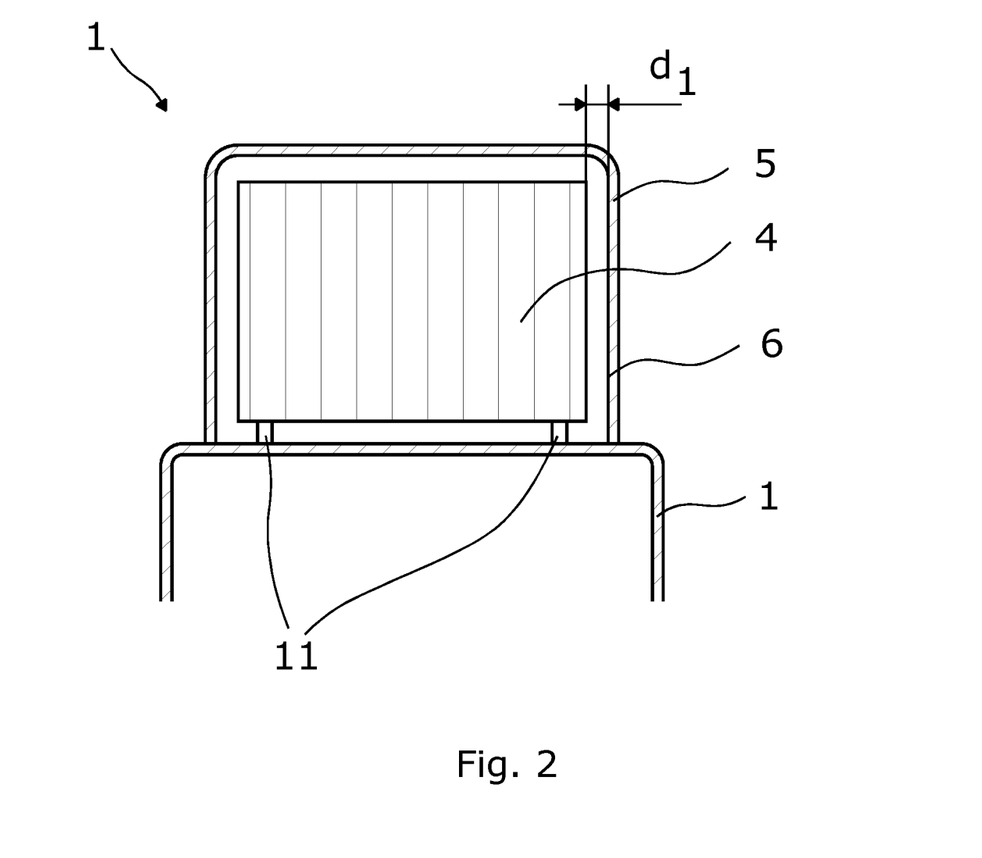
FIG. 2 shows one embodiment of the nacelle having a cooling device.

FIG. 2 shows a partly cross-sectional view of the cover 5 and the top part of the wind turbine nacelle 1. The cooling device 3 is arranged on top of the wind turbine nacelle 1 and the fluid for cooling parts of the wind turbine nacelle or the equipment inside runs in tubing in the cooling area 4. The cooling device 3 is connected with the nacelle 1 through two tube connections 11 in which the tubing runs.

The cover 5 is fastened on the first face 2 and encloses, together with the first face, the cooling device 3. In this embodiment, the cover 5 has an inner face 6 in the form of two side inner faces 12 and a top inner face. The cooling area 4 is positioned at a distance to the inner face 6. In this embodiment, the distance between the inner face and the cooling area 4 is a gap 8 through which the wind flows and creates turbulence on the back side of the cooling area in order to suck wind in through the cooling area.

Tests have shown that the optimal distance $d_1$ between the cooling area 4 and the inner face 6 is at least 20 mm, preferably at least 50 mm, more preferably at least 80 mm, and even more preferably at least 100 mm.

A further advantage of enclosing the cooling device within the cover is thus that the cover may provide the wind turbine nacelle with a recognisable design, which may be used to identify the manufacturer of the wind turbine.

Figure 3:
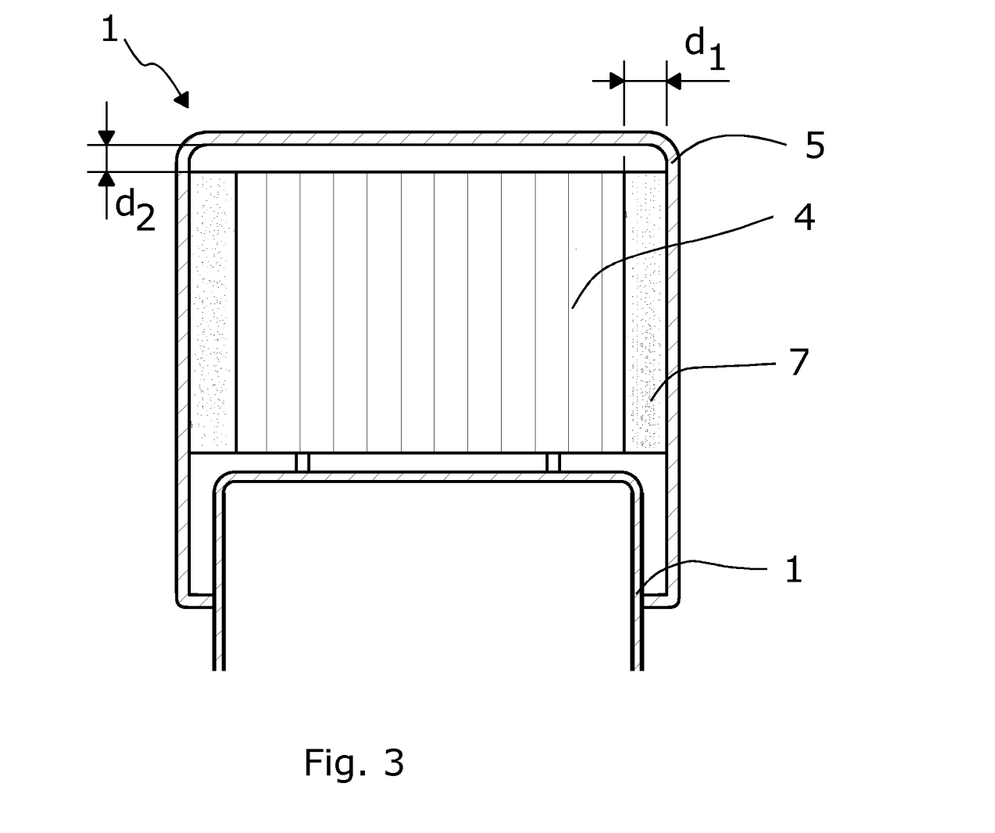
FIG. 3 shows another embodiment of the nacelle.

In FIG. 3, the gap and thus the distance $d_1$ between the side inner face and the cooling area 4 are blocked, i.e. filled out with a blocked area, and a second distance $d_2$ between the inner face and the top of the cooling area is in the form of a gap. As can be seen, a third distance $d_3$ between the top inner face and the top of the cooling area 4 is also in the form of a gap through which the wind flows.

The cover 5 of FIG. 3 is fastened to the side of the wind turbine nacelle 1 and extends perpendicular to the side of the wind turbine nacelle and since upwards and parallel to the side of the wind turbine nacelle resulting in the creation of a space between the side of the nacelle and the inner face of the cover.

The wind turbine nacelle may have at least one opening arranged in the side of the nacelle and situated outside the cover so that the cover covers the opening or openings. The cover may be closed at its front so that wind flowing along the side of the nacelle is diverted outside the cover and turbulence is created at the back of the cover so that air within the nacelle is sucked out trough the openings without any pumping means.

Furthermore, the cover 5 may also be connected to the nacelle 1 at a top face of the nacelle.

By fastening the cover 5 to the side of the nacelle, the wind profile of the wind flowing along the first face 2 of the wind turbine nacelle is not changed. Furthermore, the cover 5 is able to cover some elements which do not have the right aesthetic appearance.

In this embodiment, the blocked area is a dummy area of the cooling device 3 which cannot be used as a cooling area. The blocked area is a plate, sheet, fabric, or awning. In another embodiment, the cooling device 3 is also fastened to the cover 5 along the blocked area.

Figure 4:
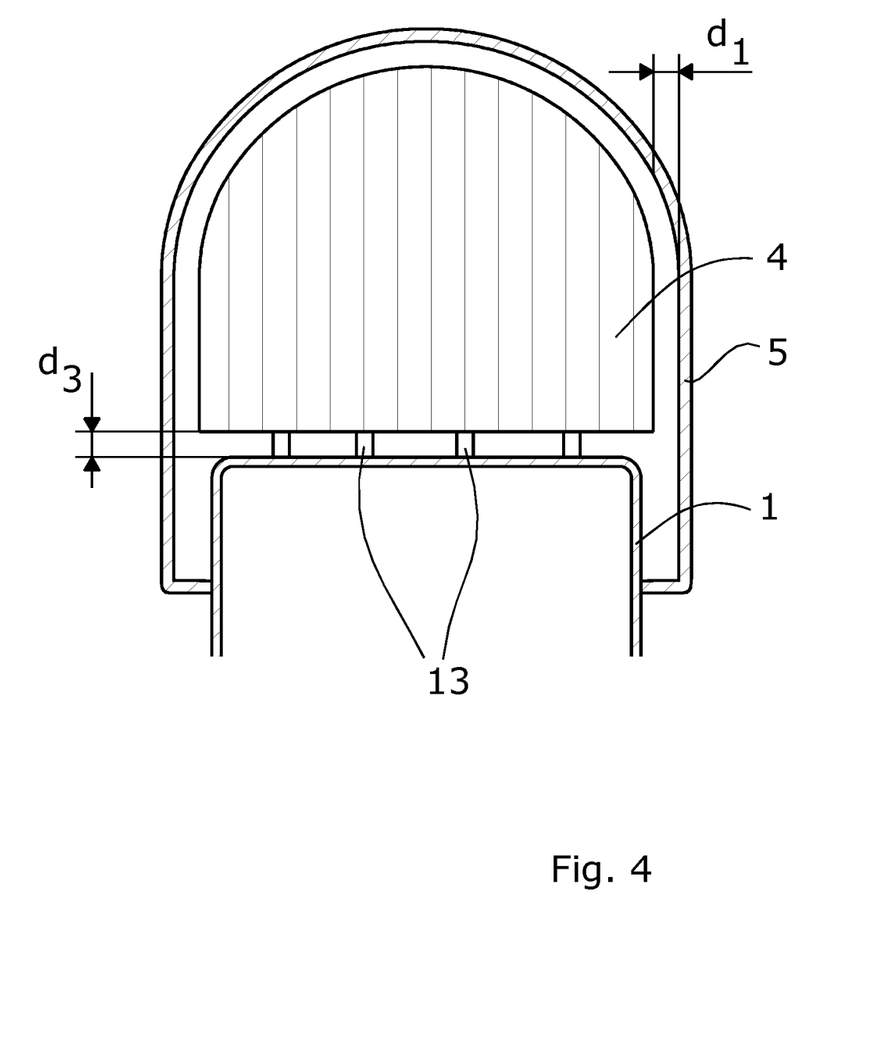
FIG. 4 shows yet another embodiment of the nacelle.

In another embodiment, the blocked area is simply an area which is not used for cooling. Part of the cooling area is blocked by closing a valve 13 or a set of valves 13. Such valves 13 are typically arranged in the bottom of the cooling device 3 as shown in FIG. 4. The valves 13 may also be arranged inside the wind turbine nacelle 1. The cover 5 in FIG. 4 has one inner face 6 since the cover, although having two sides and a top, is constituted by one wall having a partly round cross-section. In this embodiment, the cooling area 4 has an extension corresponding to the inside of the cover 5 so that the distance between the inner face 6 and the cooling area is substantially constant. However, the third distance $d_3$ differentiates from the first distance.

Figure 5:
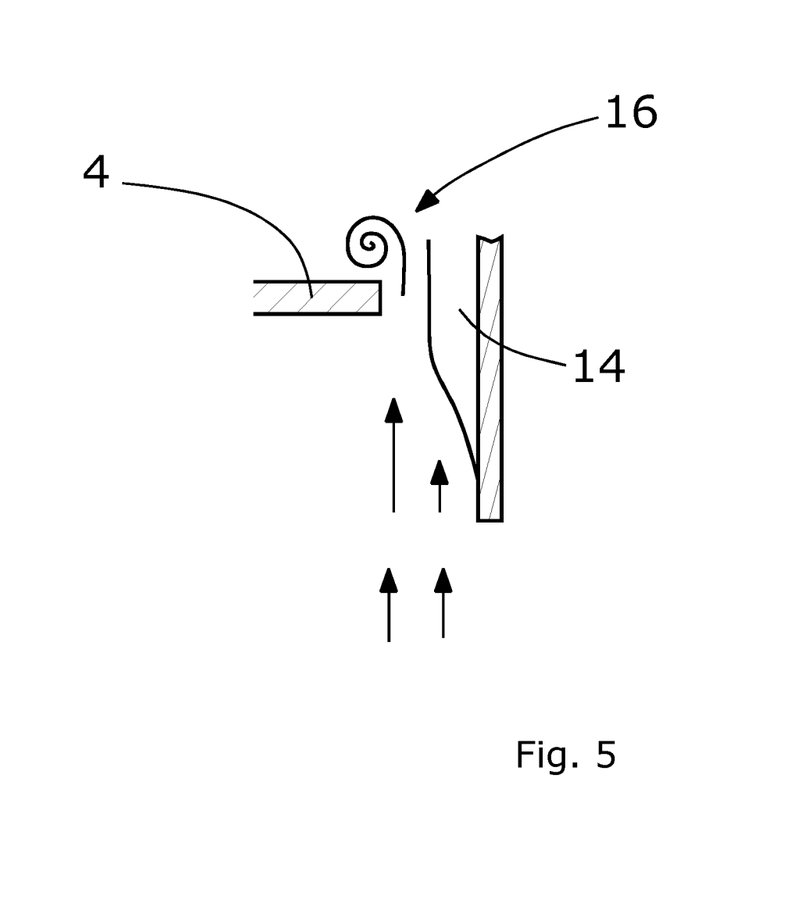
FIG. 5 shows an illustration of the wind profile along the inner face of the cover.

As mentioned, the wind flows along the first face 2 of the wind turbine nacelle through the cooling area 4 and enters on the back of the cooling device 3. When the wind arrives at the front edge 9 of the cover, the wind profile changes close to the inner face 6 of the cover 5, as the cover slows down the wind. This is illustrated as a slow wind area 14 in FIG. 5. The gap needs to be widened so that all the passing wind is not slowed down and thus cannot create turbulence on the back of the cooling area 4. As illustrated by the whorl 16, the wind flowing through the gap between the cooling area 4 and the inner face 6 causes a turbulent flow on the back of the cooling area near the edge of the cooling area. If the gap is too small, insufficient turbulence will be created as all the wind is slowed down.

Figure 6:
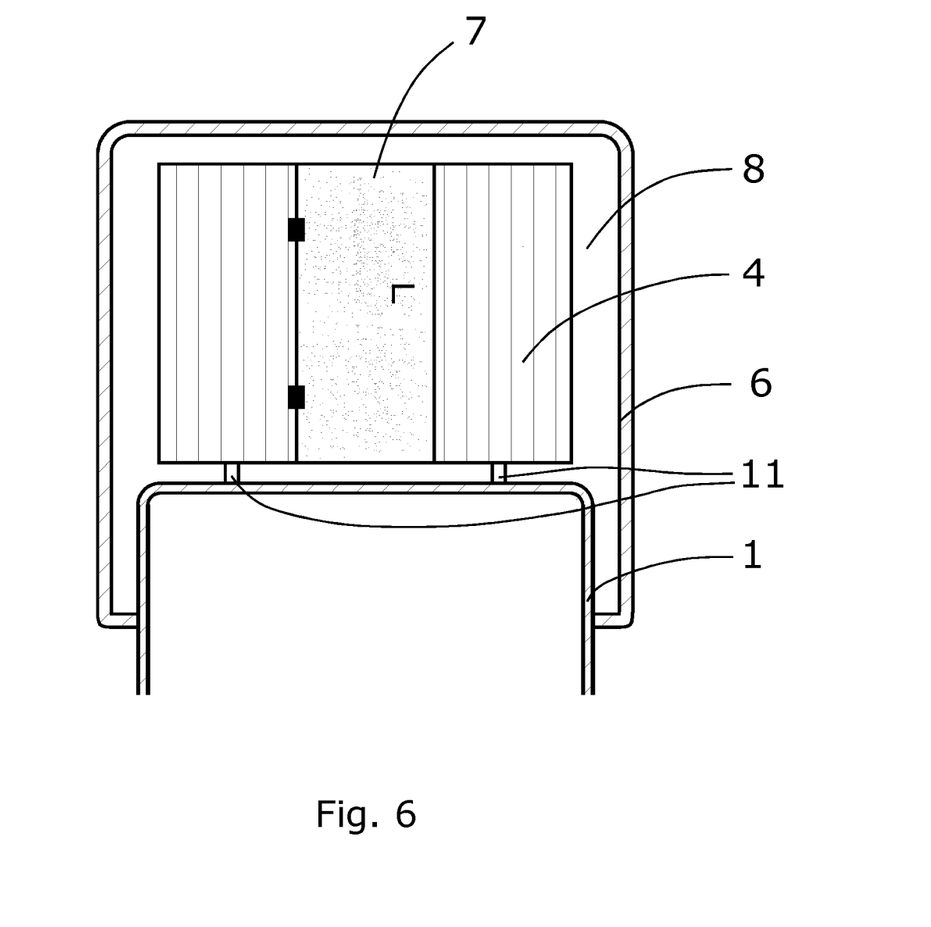
FIG. 6 shows another embodiment of the nacelle having a passage through the cooling device.

The blocked area is primarily inserted because not all the cooling capacity of the cooling device 3 is needed. When making the blocked area as a permanently blocked area, money is saved due to the fact that a plate or sheet is less expensive to make than a cooling area 4. As shown, the blocked area can be placed in any position in the cooling device 3, i.e. both in the middle of the cooling area 4 and at the sides of the cooling area. In order to gain access to equipment positioned in the rear part of the wind turbine nacelle 1, the cooling device 3 may be provided with a door, as shown in FIG. 6. In this embodiment, the door constitutes a permanently blocked area; however, in another embodiment, the door may constitute a part of the cooling area 4.

Figure 7:
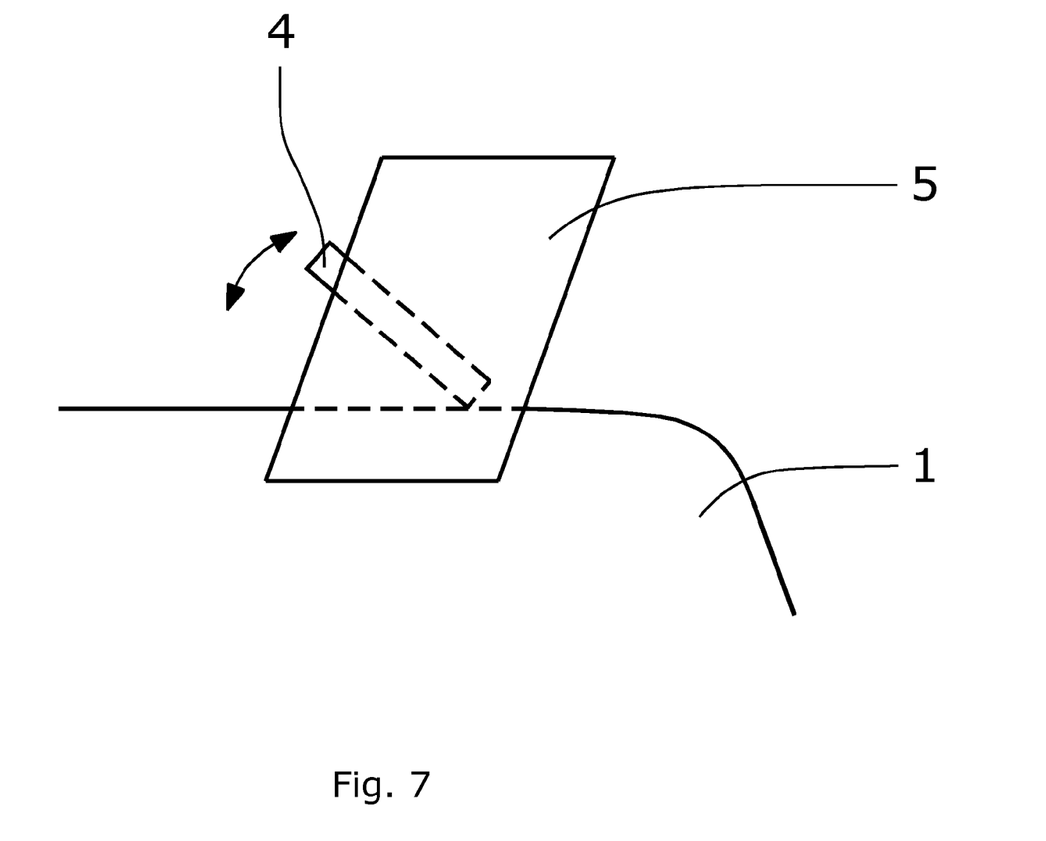
FIG. 7 shows a side view of the nacelle in which the cooling device is tilted.

In order to clean the cooling area 4, the cooling device 3 may be pivotably connected to the cover 5 so that the cooling device can be tilted towards or even lowered down onto the first face 2, as shown in FIG. 7. Thus, a service person is able to clean the back side of the cooling area 4. Furthermore, a service person is able to access the end part of the wind turbine nacelle 1.

Figure 8:
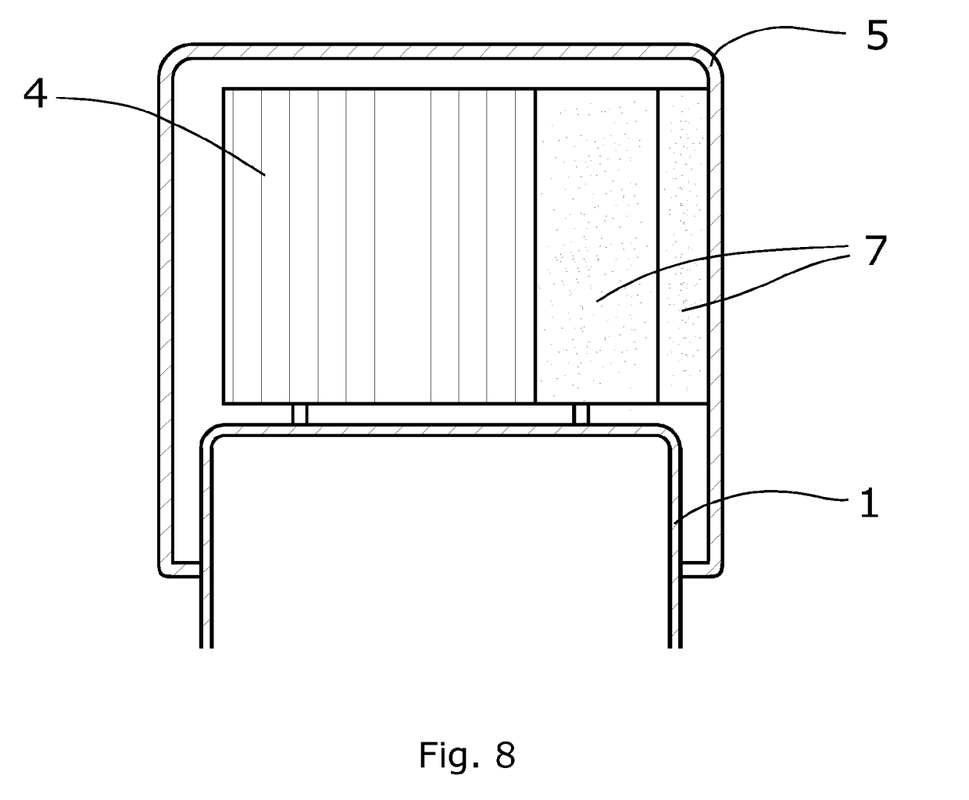
FIG. 8 shows yet another embodiment of the nacelle with an adjustable blocked area.

In addition, the cooling device 3 may have a blocked area arranged in one side of the cover 5 as shown in FIG. 8. In this embodiment, the blocked area is adjustable. The blocked area is in the form of two plates or sheets which are slidably connected to one another. The blocked area is decreased by sliding one sheet towards the other so that the sheets overlap, and increased by sliding one sheet away from the other so that the overlap is decreased. An adjustable blocked area is only shown in one side of the cooling device 3; however, it may also be present elsewhere in the cooling device, e.g. in the top or the bottom.

In addition, the cooling area 4 may be adjusted in size and thus capability. One way of increasing the cooling area 4 is to open the previously mentioned valves, thus turning the blocked area into a cooling area. Another way is to have an extendable cooling device 3, e.g. in the form of overlapping cooling areas 4 the overlap of which may be decreased or increased.

By adjusting the blocked area and/or the cooling area 4, the gap or the distance between the inner face 6 of the cover and the cooling area may be adjusted. Furthermore, the size of gap or the distance may be adjusted by adjusting a projecting part on the inner face 6 of the cover outside the cooling area 4. In addition, the gap may be filled with a sheet or a plate, which is perforated or holed in order to align the wind flow through the gap with the wind flow through the cooling area 4.

The nacelle may also comprise a plurality of cooling devices arranged side by side to form one cooling surface. The cooling devices may be connected to the cooling system as a series or a parallel circuit. One cooling device may be connected to one cooling circuit cooling some elements in the drive train, and another cooling device may be connected to another cooling circuit cooling another section of elements in the drive train. The cooling devices may be connected by means of valves which can fluidly disconnect two cooling devices so that they form part of two separate cooling circuits whereby they can cool separate elements or sections in the nacelle.

The cooling devices may also be arranged with a mutual distance creating a space between them so that wind can flow between two cooling devices in this space. The distance between two cooling devices may be between 20 and 200 mm, preferably between 50 and 150 mm, and even more preferably between 80 and 120 mm.

The cooling devices may be slidable in relation to each other so as to provide access to the rear part of the nacelle behind the cooling device.

Furthermore, a hinge connection may be arranged between at least two cooling devices. The hinge connection may for instance be arranged at a top and at a bottom of the cooling devices.

In an embodiment of the invention, an air gap is arranged between two adjacent cooling devices, and in relation to this embodiment, the hinge connection between the two cooling devices may comprise at least two corrugated metal pipes, the corrugated metal pipes being connected to and extending between the cooling devices, for instance at their top and bottom. By implementing a corrugated metal pipe as the hinge connection, it is obtained that the pipe may easily be bent in any direction, and one cooling device may thereby be displaced and moved in relation to the other cooling device, creating a passage from the upwind side of the cooling devices to the downwind side, or vice versa.

Furthermore, a rod may be arranged along the corrugated pipe. The first end of the rod is connected to the cooling device which may be moved. The second end stops at a predetermined distance from the adjacent cooling device, meaning that the second end of the rod defines the point of rotation of the hinge. Within the inventive idea, the hinge connection may only comprise one corrugated metal pipe and one rod, however, if two or more corrugated metal pipes are arranged between adjacent cooling devices, each pipe or only selected pipes may also comprise a rod extending along them.

Advantageously, the corrugated metal pipes are preferably made of stainless steel, meaning that the lifetime of the hinge connection is prolonged and that the hinge connection is not deteriorated by the environment, such as by UV radiation, etc.

Furthermore, the corrugated metal pipes may also absorb potential misalignment and different production tolerances of the cooling devices.

In addition, rails may be arranged at the cover and at the first face of the nacelle, which may guide the cooling device when it is being moved.

Furthermore, the cooling device may be connected to the cover and the first face of the nacelle via at least two connection points, the first connection point being a rigid connection and the second connection point being a flexible connection. The rigid connection may be some kind of metal bracket being secured to the cover and extending downwards towards the cooling device. The cooling device may then be mounted on the metal bracket, for instance via a bolt connection. The flexible connection may for instance be some kind of corrugated metal sheet or strip which is at one end connected to the nacelle and at the other end connected to the cooling device via for instance a bolt connection. The corrugated metal sheet is then able to absorb any expansion or retraction of the cooling device so that neither the cooling device nor the cover or nacelle are damaged.

Advantageously, the connection points are made of conductive material, such as metal, meaning that they may also be used for leading high current from a lightning to the ground and thereby be a part of the wind turbines lightning protection system.

Figure 9:
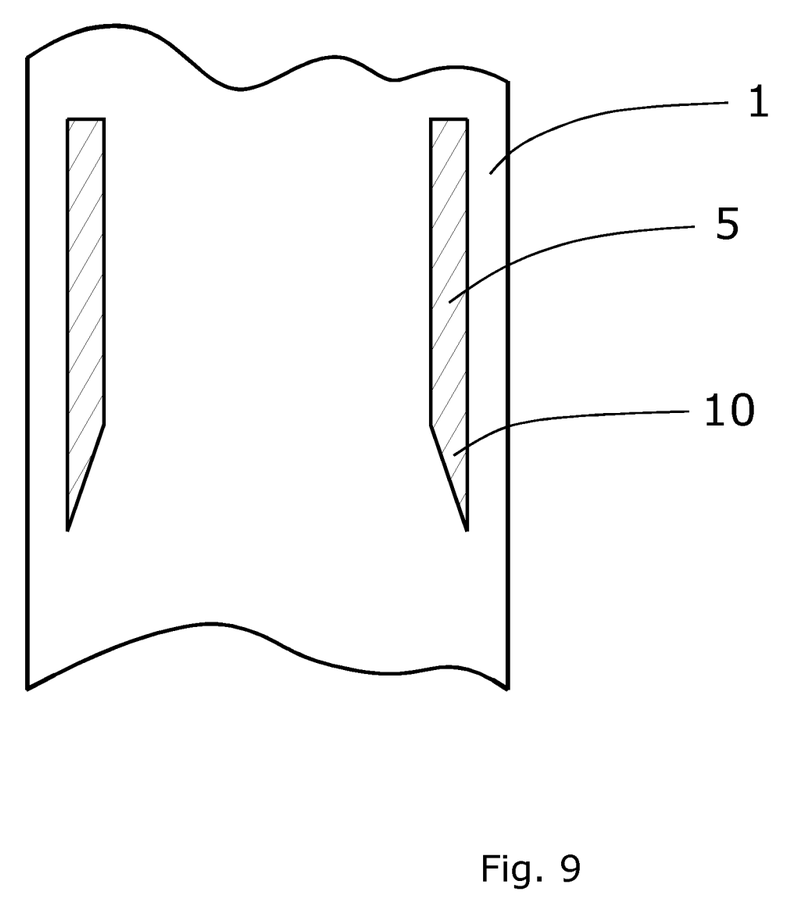
FIG. 9 shows a cross-sectional view of an embodiment of the cover.

Furthermore, the cover 5 may be designed so that the inner face 6 and thus a front part 10 of the cover taper towards the cooling device 3, as shown in FIG. 9. In this embodiment, an outside wall of the cover 5 is kept straight, meaning that the form of the outside wall remains unchanged and that the cover 5 of the wind turbine nacelle 1 thus still appears a smooth, unbroken surface. In this way, wind is guided in under the cover and through the cooling area 4.

Figure 10:
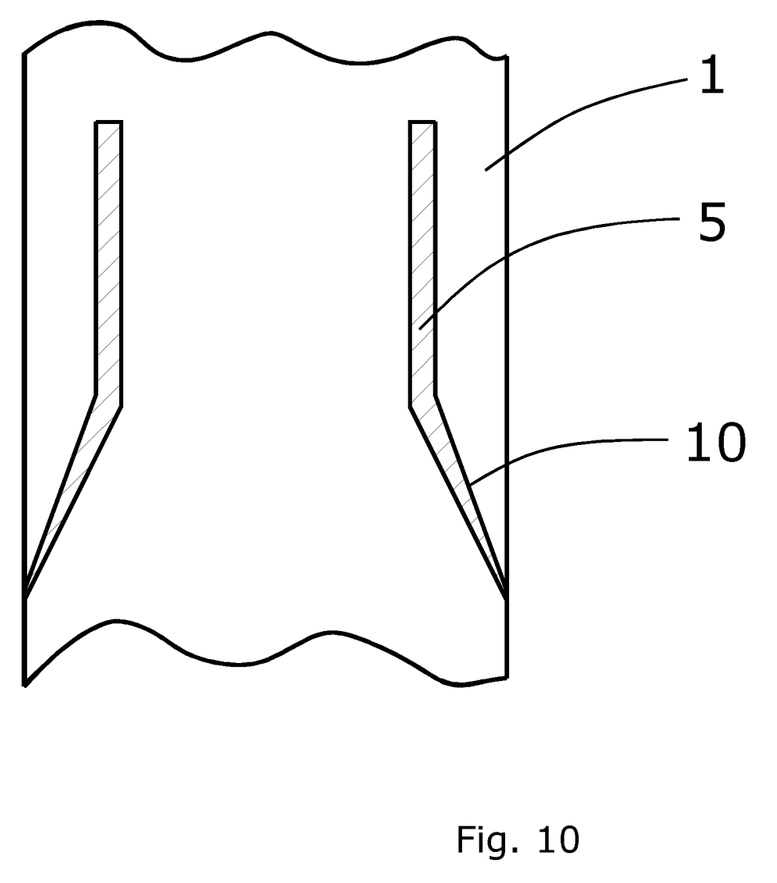
FIG. 10 shows a cross-sectional view of another embodiment of the cover.

In another embodiment, the front part 10 of the cover also tapers towards the cooling device 3, as shown in FIG. 10. However, in this embodiment, the wall of the front part 10 of the cover tapers towards the device, and the cover 5 is thus able to guide the wind in under the cover and through the cooling area.

Wind is guided in under the cover 5 due to the fact the cover, together with the first face 2 of the wind turbine nacelle 1, encloses the cooling device 3.

The cover 5 is shown having a roof extending substantially parallel to the first face 2 of the wind turbine nacelle 1. However, in another embodiment, the roof of the cover 5 may extend at an angle towards the first face 2 of the nacelle.

The cover 5 is shown fastened to the top part of the wind turbine nacelle 1. However, the cover 5 may also be fastened further down the sides of the wind turbine nacelle 1. It may even be fastened near the bottom of the nacelle 1, and may also at least partly enclose the bottom of the wind turbine nacelle. When the cover is not fastened at the first face of the nacelle, a space between the side face of the wind turbine nacelle and the inner face of the cover is created. The cover may be fastened at the side face of the nacelle and extend somewhat perpendicular to the side face of the nacelle and then extend along the side face creating a space between the side face of the nacelle and the inner face of the cover.

Outside the cover, the side face of the nacelle may have an side opening so that the cover covers the side opening. Hereby, the openings are not visible from the outside of the wind turbine and the aestetic impression of the wind turbine is upheld.

The side opening is used for letting heated air out of the nacelle and for this purpose a fan is often used to force out the heated air. Such fans or blowers has a high emission of noise and, in order to reduce noise emission of the wind turbine, the space may be filled with sound insulation material.

In some low wind situations, the wind turbine may support the grid requirements, e.g. by delivering reactive effects to the grid. In these circumstances, additional cooling may be arranged in relation to the nacelle, e.g. a fan or additional media cooling circuits.

The rear part of the wind turbine nacelle 1 may have any kind of shape. Thus, it may be round, upwardly or downwardly inclined, or be a vertically straight face so that the end face is perpendicular to the longitudinal extension of the wind turbine nacelle 1.

In the rear part of the wind turbine nacelle, a transformer may be arranged and, if the transformer needs replacement or comprehensive fixing, the transformer has to taken out by means of a crane. By having a cover enclosing the cooling device, it is difficult to take out the transformer without dismounting the cover. In order to take out the transformer, at least one part of the cover may be movable in relation to another part of the cover, the cooling device, or the first face of the nacelle. Hereby, it is possible to remove the transformer by means of a crane.

Furthermore, the movable part of the cover may be a hatch in the top of the cover. The hatch has the size of the element which has to be removed, such as a transformer.

In addition, the movable part of the cover may be the whole cover. The cover may be pivotably connected to the nacelle. Access to e.g. the transformer or the generator is thus gained by pivoting the cover forward or backward so that the cover lies along the first face of the nacelle. In its simple form, the cover is a bended plate so that the front edge of the cover abuts the first face of the wind turbine nacelle.

Furthermore, the movable part of the cover may be a removable top part, e.g. the roof part of the cover, or the roof part may be pivotably connected to the side parts of the cover, e.g. at the middle or at the front edge.

In order to gain access to e.g. a transformer in the rear part of the wind turbine nacelle, the cover may have a hatch which is opened for removing the transformer or other parts in the rear of the wind turbine nacelle.

In addition, steps or ladders may be arranged on the cooling device or on the cover so that a repairman can access the roof of the cover and thereby instruments arranged at the roof of the cover. In one embodiment, a plate is hingedly connected to the inner face of the cover as a leaf of a table. The plate is unfolded by placing the plate in a horizontal position, and a supporting element, such as legs, are unfolded to support the plate by resting against the top face of the nacelle. In another embodiment, a ladder is telescopic, and when unfolded, a tap secures that it folds together. The ladder may be placed several places on the roof of the nacelle, or the ladder may in one end be fastened to the roof or below the roof and only be unfoldable when a hatch in the roof is opened. The roof of the nacelle may have indentations into which the legs of the ladder can be positioned so that the ladder does not move while a person is climbing the ladder.

In addition, the first face 2 and a bottom face of the wind turbine nacelle 1 may taper towards the hub or towards the rear part of the nacelle.

The above-mentioned cooling device 3 may be any kind of cooler, heat sink, or heat exchanger where a first fluid, such as the wind, cools a second fluid, such as a coolant, a refrigerant, or the like fluid. In a preferred embodiment, the cooling device 3 is a free flow cooler, i.e. a heat sink through which the wind surrounding the cooling area 4 passes freely and in that way cools the fluid flowing within the tubing of the cooling device.

The blocked area may be a sheet, such as a metal sheet, or a plate made of fibreglass, a composite comprising glass fibres, carbon fibres, or other fibre elements. The blocking plate may even be a painted fibreboard or chipboard.

For the purpose of illustration, the form of the nacelle 1 has merely been sketched. In reality, the nacelle is usually highly aerodynamic in shape and may have rounded corners instead of appearing as a square box. Furthermore, the sides of the nacelle may be concave or convex. Even though the wind turbine nacelle 1 is shown as being on a horizontal line, the nacelle is rarely perpendicular to the centre axis of the tower, but often has an angle in relation to a horizontal line.

Furthermore, the cover 5 may have any kind of shape. Even though the cover 5 is primarily shown as having a partly square cross-section with rounded corners, the cover may have more than three sides, e.g. seven sides.

In addition, the cover 5 may be used as a platform for avi-light, an anemometer, or a lightning conductor.

By wind turbine is meant any kind of apparatus able to convert wind power into electricity, such as a wind generator, wind power unit (WPU), or wind energy converter (WEC).

Furthermore, during transportation of the nacelle to the site where it is to be installed, the cover may be transported separately from the nacelle. However, the nacelle and the cover may also be transported together. Where this is the case, the cover may either be displaced downwards towards the nacelle (the sides of the cover extending on the outside of the nacelle), or it may comprise some kind of hinge means enabling it to be turned either towards the end of the nacelle or towards the front. In this way, the overall height of the nacelle and cover is minimised so that it may be transported on public roads.

Although the invention has been described in the above in connection with preferred embodiments of the invention, it will be evident for a person skilled in the art that several modifications are conceivable without departing from the invention as defined by the following claims.

The invention claimed is:

1. A wind turbine nacelle having a first exterior face with a longitudinal extension in a wind direction, comprising:
    a cooling device having a cooling area, and extending outwardly from the first face of the nacelle, and being directly exposed to ambient wind flow, and
    a cover having at least one inner face, the cooling device being enclosed by the first face of the nacelle and the inner face of the cover, wherein a first distance between at least one of the faces and the cooling area is at least 20 mm.

2. The wind turbine nacelle according to claim 1, wherein the distance is at least 50 mm.

3. The wind turbine nacelle according to claim 1, wherein the cover has two side inner faces and an upper inner face, and the cooling device is enclosed by the first face of the nacelle and the two side inner faces and the upper inner face of the cover.

4. The wind turbine nacelle according to claim 3, wherein the distance between the upper inner face and the cooling area is different from the distance between the side inner face and the cooling area.

5. The wind turbine nacelle according to claim 1, wherein the cooling device extends substantially perpendicular to the first face of the nacelle.

6. The wind turbine nacelle according to claim 1, wherein the inner face of the cover extends in the longitudinal extension of the nacelle and substantially perpendicular to the cooling device.

7. The wind turbine nacelle according to claim 1, wherein more than one face has a distance to the cooling area.

8. The wind turbine nacelle according to claim 1, wherein the distance between at least one of the faces and the cooling area constitutes a gap.

9. The wind turbine nacelle according to claim 1, wherein the cover has a front edge and the cooling device is placed at a front distance of at least 440 mm from the front edge.

10. The wind turbine nacelle according to claim 1, wherein the cooling device is a free flow cooling device.

11. The wind turbine nacelle according to claim 1, wherein the cover is fastened to the nacelle so that the cover extends perpendicular to the longitudinal extension of the nacelle and partly along the nacelle creating a space between the nacelle and the cover.

12. The wind turbine nacelle according to claim 1, further comprising a plurality of cooling devices arranged with a mutual distance, wherein the distance between two cooling devices is between 20 and 200 mm.

13. A wind turbine comprising a wind turbine nacelle according to claim 1.

14. The wind turbine nacelle according to claim 1, wherein the cover has two side inner faces and an upper inner face, and the cooling device is enclosed by the first face of the nacelle and the two side inner faces and the upper inner face of the cover, wherein the cooling device extends substantially perpendicular to the first face of the nacelle, and wherein the inner face of the cover extends in the longitudinal extension of the nacelle and substantially perpendicular to the cooling device.

15. A wind turbine nacelle having a first face with a longitudinal extension in a wind direction, comprising:
    a cooling device having a cooling area and extending from the first face of the nacelle, and
    a cover having at least one inner face, the cooling device being enclosed by the first face of the nacelle and the inner face of the cover, wherein a first distance between at least one of the faces and the cooling area is at least 20 mm,
    wherein the cooling device has a blocked area which is unable to constitute a part of the cooling area.

16. The wind turbine nacelle according to claim 15, wherein the distance between at least one of the faces and the cooling area constitutes the blocked area.

17. The wind turbine nacelle according to claim 15, wherein the blocked area is adjustable.

18. The wind turbine nacelle according to claim 15, wherein the blocked area constitutes at least 20% of an overall area of the cooling device.

19. The wind turbine nacelle according to claim 15, wherein the blocked area is constituted by a plate, sheet, fabric, or awning.

20. The wind turbine nacelle according to claim 15, wherein the blocked area is blocked from circulating cooling fluid by means of valves.

21. A wind turbine nacelle having a first face with a longitudinal extension in a wind direction, comprising:
    a cooling device having a cooling area and extending from the first face of the nacelle, and
    a cover having at least one inner face, the cooling device being enclosed by the first face of the nacelle and the inner face of the cover, wherein a first distance between at least one of the faces and the cooling area is at least 20 mm,
    wherein the distance between at least one of the faces and the cooling area constitutes a gap,
    wherein the gap is adjustable.

22. A wind turbine nacelle having a first face with a longitudinal extension in a wind direction, comprising:
    a cooling device having a cooling area and extending from the first face of the nacelle, and
    a cover having at least one inner face, the cooling device being enclosed by the first face of the nacelle and the inner face of the cover, wherein a first distance between at least one of the faces and the cooling area is at least 20 mm, wherein the cooling area is adjustable.

23. A wind turbine nacelle having a first face with a longitudinal extension in a wind direction, comprising:
- a cooling device having a cooling area and extending from the first face of the nacelle, and
- a cover having at least one inner face, the cooling device being enclosed by the first face of the nacelle and the inner face of the cover, wherein a first distance between at least one of the faces and the cooling area is at least 20 mm,
- wherein the cover at least on its inside has a front part tapering from the front edge towards the cooling device so as to guide air in through the cooling area.

24. A wind turbine nacelle having a first face with a longitudinal extension in a wind direction, comprising:
- a cooling device having a cooling area and extending from the first face of the nacelle, and
- a cover having at least one inner face, the cooling device being enclosed by the first face of the nacelle and the inner face of the cover, wherein a first distance between at least one of the faces and the cooling area is at least 20 mm,
- wherein at least one part of the cover is movable in relation to another part of the cover, the cooling device or the first face of the nacelle.

25. The wind turbine nacelle according to claim 24, wherein the movable part of the cover is a hatch in the top of the cover.

26. The wind turbine nacelle according to claim 24, wherein the movable part of the cover is the whole cover which is pivotably connected to the nacelle or is a hatch in the top of the cover.

27. A wind turbine nacelle having a first face with a longitudinal extension in a wind direction, comprising:
- a cooling device having a cooling area and extending from the first face of the nacelle, and
- a cover having at least one inner face, the cooling device being enclosed by the first face of the nacelle and the inner face of the cover, wherein a first distance between at least one of the faces and the cooling area is at least 20 mm,
- wherein the cover has a flange projecting in an angle from the inner face, decreasing an opening defined by the first face and the inner face.

28. A wind turbine nacelle having a first face with a longitudinal extension in a wind direction, comprising:
- a cooling device having a cooling area and extending from the first face of the nacelle, and
- a cover having at least one inner face, the cooling device being enclosed by the first face of the nacelle and the inner face of the cover, wherein a first distance between at least one of the faces and the cooling area is at least 20 mm,
- further comprising a plurality of cooling devices arranged with a mutual distance, wherein the distance between two cooling devices is between 20 and 200 mm,
- wherein a hinge connection is arranged between at least two cooling devices.

29. The wind turbine nacelle according to claim 28, wherein the hinge connection is arranged at a top and at a bottom of the cooling devices.

30. The wind turbine nacelle according to claim 28, wherein the hinge connection comprises at least two corrugated metal pipes, the corrugated metal pipes being connected to and extending between the cooling devices, and the corrugated metal pipes preferably being made of stainless steel.

31. A wind turbine nacelle having a first face with a longitudinal extension in a wind direction, comprising:
- a cooling device having a cooling area and extending from the first face of the nacelle, and
- a cover having at least one inner face, the cooling device being enclosed by the first face of the nacelle and the inner face of the cover, wherein a first distance between at least one of the faces and the cooling area is at least 20 mm,
- wherein the cooling device is connected to the cover and the first face of the nacelle via at least two connection points, the first connection point being a rigid connection and the second connection point being a flexible connection.

32. The wind turbine nacelle according to claim 31, wherein the at least two connection points are made of conductive material.

* * * * *